United States Patent
Vollert et al.

(10) Patent No.: US 8,459,753 B2
(45) Date of Patent: Jun. 11, 2013

(54) ELECTROMECHANICAL BRAKE FORCE BOOSTER

(75) Inventors: Herbert Vollert, Vaihingen/Enz (DE); Reinhard Weiberle, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/140,964

(22) PCT Filed: Oct. 28, 2009

(86) PCT No.: PCT/EP2009/064187
§ 371 (c)(1), (2), (4) Date: Jun. 20, 2011

(87) PCT Pub. No.: WO2010/069658
PCT Pub. Date: Jun. 24, 2010

(65) Prior Publication Data
US 2011/0253490 A1 Oct. 20, 2011

(30) Foreign Application Priority Data
Dec. 18, 2008 (DE) .......................... 10 2008 054 852

(51) Int. Cl.
*B60T 8/60* (2006.01)
(52) U.S. Cl.
USPC .................................... 303/114.1; 303/115.2

(58) Field of Classification Search
USPC ..... 188/156; 303/114.1, 114.3, 115.2; 60/545
See application file for complete search history.

(56) References Cited

U.S. PATENT DOCUMENTS

| | | | |
|---|---|---|---|
| 5,031,972 A * | 7/1991 | Steinhauser et al. | 303/115.2 |
| 5,094,079 A * | 3/1992 | Leigh-Monstevens et al. | 60/545 |
| 7,367,187 B2 * | 5/2008 | Ikeda et al. | 60/545 |
| 2002/0158510 A1 * | 10/2002 | Kobayashi et al. | 303/155 |
| 2003/0024245 A1 * | 2/2003 | Fulks et al. | 60/545 |
| 2008/0302100 A1 | 12/2008 | Ohtani et al. | |
| 2011/0297493 A1 * | 12/2011 | Vollert et al. | 188/106 R |

FOREIGN PATENT DOCUMENTS

| | | |
|---|---|---|
| DE | 10057557 A1 | 12/2001 |
| DE | 202005018018 U1 | 8/2006 |
| DE | 102008038320 A1 | 5/2009 |
| EP | 2000376 A1 | 12/2008 |

* cited by examiner

*Primary Examiner* — Christopher Schwartz
(74) *Attorney, Agent, or Firm* — Maginot, Moore & Beck

(57) ABSTRACT

The invention relates to an electromechanical brake force booster for a hydraulic vehicle brake system. The invention proposes that the brake force booster be formed with two restoring springs, one of which acts on an electromechanical actuator and the other of which restoring springs acts on a pedal rod. In the event of failure of the electromechanical actuator, only the other spring, which preferably has a relatively low spring force, must be compressed using muscle force. The force loss in the event of actuation exclusively by muscle force is reduced.

15 Claims, 1 Drawing Sheet

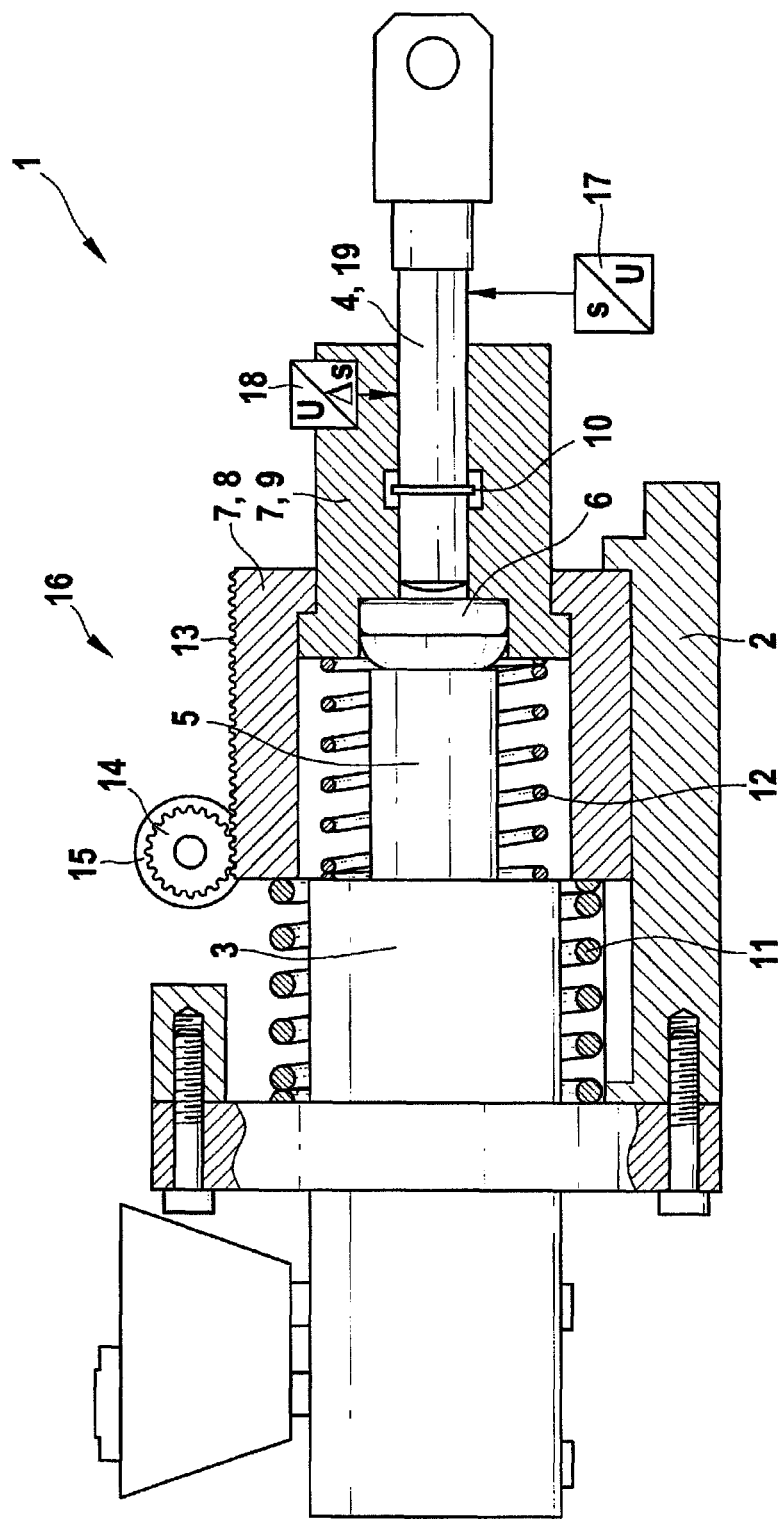

ELECTROMECHANICAL BRAKE FORCE BOOSTER

CROSS-REFERENCE TO RELATED APPLICATION

This application is a 35 USC 371 application of PCT/EP2009/064187 filed on Oct. 28, 2009.

BACKGROUND OF THE INVENTION

Field of the Invention

The invention relates to an electromechanical brake booster. The brake booster is in particular provided for motor vehicles.

Description of the Prior Art

Electromechanical brake boosters are known. They have a muscular force transmitting element by means of which it is possible to use muscular force to actuate a brake master cylinder of a hydraulic vehicle brake system. The muscular force transmitting element of known brake boosters is a piston rod that is connected in articulating fashion to a foot-actuated brake pedal or hand-actuated brake lever and presses against a rod piston of the brake master cylinder. The piston rod is also referred to as the pedal rod; the rod piston is also referred to as the primary piston. The muscular force that a vehicle driver exerts is mechanically transmitted via the muscular force transmitting element to the piston of the brake master cylinder.

The known electromechanical brake boosters are also equipped with an electromechanical actuator by means of which is likewise possible to actuate the brake master cylinder. The actuator force exerted by the electromechanical actuator is referred to as auxiliary force. If the break actuation is carried out exclusively with the electromechanical actuator, this is referred to as external force instead of auxiliary force.

The electromechanical actuator can have an electromagnet, a linear motor, or an electric motor connected to a subsequent rotation/translation converting transmission. This list is not exhaustive.

An example of an electromechanical brake booster is the patent application DE 100 57 557 A1, which has a pedal rod for muscular force actuation and optionally an electromagnet or a linear motor for the auxiliary force actuation of a brake master cylinder. The known electromechanical brake booster has a return spring that moves the brake booster back to its starting position after an actuation. The return spring can in general be understood to be an elastically deformable element that is stressed upon actuation of the brake booster and as mentioned above, moves the brake booster back to its starting position after an actuation. The known brake booster has a return spring embodied in the form of a helical compression spring. A spring force of the return spring must be powerful enough to move the brake booster back to the starting position in a short time so that for example a foot-actuated brake pedal follows a driver's foot when the driver lifts his foot away from the brake pedal after a brake actuation. The driver should not get the feeling of a perceptible delay in the releasing of the vehicle brake after its actuation. Also, the vehicle brake system should release a short time after an actuation so that the vehicle once again rolls in an unbraked fashion, which requires a likewise rapid releasing of the brake booster.

When an electromechanical brake booster is functioning normally, the return spring does not pose a problem because the force required to stress the return spring is exerted by the electromechanical actuator and does not have to be exerted by muscular force. But if the electromechanical actuator fails, a driver must use muscular force to stress the return spring in order to actuate the brake; the spring force of the return spring correspondingly reduces the actuation force with which the brake master cylinder is actuated.

ADVANTAGES AND SUMMARY OF THE INVENTION

The electromechanical brake booster according to the invention, has at least two return springs, one of which returns the muscular force transmitting element. The other return spring or springs usually return(s) the brake booster, but do (es) not act on the muscular force transmitting element. This has the advantage that in the event of a failure of the electromechanical actuator, in order to actuate the brake master cylinder, a vehicle driver only has to exert muscular force in opposition to the return spring of the muscle force transmitting element and not in opposition to one or more return springs that are provided for the return of the electromechanical brake booster, in particular for the return of the electromechanical actuator. In the event of a failure of the electromechanical actuator, a larger portion of the muscular force is therefore available for actuating the brake master cylinder.

According to the invention, the return spring for the muscle force transmitting element has a lower spring force than the other return spring or springs. As a result, in the event of a failure of the electromechanical actuator, the driver only has to exert a relatively low force in order to stress the return spring so that most of the muscular force exerted by the driver to actuate the brake is in fact used to actuate the brake master cylinder.

BRIEF DESCRIPTION OF THE DRAWINGS

The invention will be explained in greater detail below in conjunction with an exemplary embodiment shown in the drawing. The drawing is understood to be a simplified, schematic representation for comprehension and illustration of the invention.

FIG. 1 shows an axial section through an electromechanical brake booster according to the invention.

DESCRIPTION OF THE PREFERRED EMBODIMENT

The electromechanical brake booster 1 according to the invention shown in the drawing has a hollow cylindrical housing 2 that is flange-mounted onto a hydraulic brake master cylinder 3. Arranged coaxially in the housing 2 of the brake booster 1, a pedal rod 4 is provided, which can be connected in articulating fashion to a foot-actuated brake pedal that is not shown. Between the pedal rod 4 and a piston 5 of the brake master cylinder 3, there is a reaction disc 6 by means of which the piston 5 can be pushed into the brake master cylinder 3, i.e. the brake master cylinder 3 and a hydraulic vehicle brake system connected to it, not shown, can be actuated in an intrinsically known way. The actuation is carried out by pressing on the foot-actuated brake pedal, not shown, i.e. with muscular force. The pedal rod 4 can generally also be referred to as a muscular force transmitting element 19.

The pedal rod 4 is arranged concentrically inside a booster element 7 that is accommodated in an axially sliding fashion in the housing 2 of the brake booster 1. The booster element 7 is embodied in the form of a two-part telescoping tube with an outer tube 8 and an inner tube 9; the pedal rod 4 is accommodated in sliding fashion in the inner tube 9 of the booster element 7 remote from the brake master cylinder 3. A sliding distance of the pedal rod 4 relative to the inner tube 9 is limited by a driving element 10. The inner tube 9 of the booster element 7 has a cylindrical recess in which the reaction disc 6 is accommodated. The telescoping ability of the booster element 7 makes it possible to reduce the structural length of the brake booster 1.

The brake booster 1 has two return springs 11, 12 that are both supported against the brake master cylinder 3. A more powerful return spring 11 pushes against the outer tube 8 of the booster element 7 while the weaker return spring 12 pushes against the inner tube 9 of the booster element 7.

The outer tube 8 of the booster clement 7 has a rack 13 that meshes with a pinion 14 that can be driven by means of an electric motor 15. A reduction gear, not shown, can be connected between the pinion 14 and the electric motor 15. The rack 13 and the pinion 14 constitute a rack-and-pinion transmission that converts a rotating driving motion of the electric motor 15 into a translatory motion for sliding the booster element 7. By means of the reaction disc 6, the booster element 7 slides the piston 5 into the brake master cylinder 3, i.e. actuates the brake master cylinder 3 and together with it, the hydraulic vehicle brake system that is not shown. The booster element 7, the rack-and-pinion transmission and the electric motor 15 constitute an electromechanical actuator 16 of the electromechanical brake booster 1.

The reaction disc 6 is a rubber-elastic disc that transmits the forces exerted on it by the pedal rod 4 and the inner tube 9 of the booster element 7 to the piston 5 of the brake master cylinder 3. It therefore constitutes a summing element.

In order to actuate the brake master cylinder 3, the foot-actuated brake pedal, not shown, is pressed in the intrinsically known fashion and the pedal rod 4 connected to it is slid in the direction of the brake master cylinder 3. By means of a position sensor 18, a relative movement of the pedal rod 4 in relation to the inner tube 9 of the booster element 7 is measured and an electronic control unit, not shown, regulates the electromechanical actuator 16. For example, it can be regulated so it is set to "zero," i.e. the electric motor 15 of the actuator 16 is supplied with current so that the inner tube 9 of the booster element 7 moves along with the pedal rod 4 with no relative motion. It is also possible for the inner tube 9 to execute an advancing or lagging motion, i.e. the inner tube 9 travels a greater or lesser distance than the pedal rod 4. In addition, the absolute sliding motion of the pedal rod 4 can be measured with a displacement sensor 17 and taken into account in the electronic regulation of the actuator 16. The displacement sensor 17 is not absolutely required; a regulation of the actuator 16 solely by means of the position sensor 18 is sufficient. By means of the reaction disc 6, the pedal rod 4 and the booster element 7 exert a force on the piston 5 in the direction of the brake master cylinder 3, i.e. they actuate the brake master cylinder 3. The ratio of the muscular force exerted via the pedal rod 4 to an actuator force exerted by the actuator 16, i.e. a boosting factor of the electromechanical brake booster 1, can be adjusted by means of the regulating component, not shown, so that it is possible for the force ratio to have any desired curve over a movement distance of the pedal rod 4. After the end of the actuation, i.e. when no further muscular force is being exerted on the pedal rod 4, the return springs 11, 12 move the brake booster 1 back to its depicted starting position, which is referred to as returning.

In the event of a failure of the electromechanical actuator 16, the brake master cylinder 3 is actuated exclusively by muscular force. In this case, the pedal rod 4 and, by means of the driving element 10, the inner tube 9 of the booster element 7, are slid in the direction toward the brake master cylinder 3. By means of the reaction disc 6, the pedal rod 4 pushes against the piston 5 and actuates the brake master cylinder 3. The outer tube 8 of the booster element 7—in which the inner tube 9 is able to slide—is not moved in sliding fashion. Therefore no stress is exerted on the return spring 11 with the greater spring force, which pushes against the outer tube 8 of the booster element 7. Stress is only exerted on the return spring 12 with the lesser spring force, which presses against the inner tube 9 of the booster element 7. In the event of a failure of the electromechanical actuator 16, in order to actuate the brake master cylinder 3 exclusively by muscular force, it is therefore only necessary to exert stress on the return spring 12 with the lesser spring force and not the return spring 11 with the greater spring force; i.e. only the return spring 12 with the lesser spring force reduces the muscular force so that with a given muscular force, the actuating force exerted on the piston 5 is greater than if it were necessary to exert stress on both return springs 11, 12.

The foregoing relates to the preferred exemplary embodiment of the invention, it being understood that other variants and embodiments thereof are possible within the spirit and scope of the invention, the latter being defined by the appended claims.

The invention claimed is:

1. An electromechanical brake booster comprising:
   a muscular force transmitting element by means of which it is possible to use muscular force to actuate a brake master cylinder;
   an electromechanical actuator by means of which it is also possible to actuate the brake master cylinder;
   at least two return springs that move the brake booster back to a starting position after an actuation, including a first return spring that returns the muscular force transmitting element and a second return spring that returns the actuator; and
   a telescoping booster element for transmitting an actuator force of the electromechanical actuator to a piston of the brake master cylinder,
   wherein the telescoping booster element is composed of an inner tube and an outer tube; and
   wherein the first return spring of the at least two return springs presses against the inner tube and the second return spring of the at least two return springs presses against the outer tube.

2. The electromechanical brake booster as recited in claim 1, wherein the first return spring and second return spring both rest against the brake master cylinder.

3. The electromechanical brake booster as recited in claim 2, wherein the second return spring has a greater spring force than the first return spring.

4. The electromechanical brake booster as recited in claim 3, wherein in the event of a failure of the electromechanical actuator, the brake master cylinder is actuated exclusively by muscular force and in order to actuate the master cylinder by muscular force, only the first return spring is stressed.

5. The electromechanical brake booster as recited in claim 2, wherein in the event of a failure of the electromechanical actuator, the brake master cylinder is actuated exclusively by muscular force and in order to actuate the master cylinder by muscular force, only the first return spring is stressed.

6. The electromechanical brake booster as recited in claim 1, wherein the first return spring has a lesser spring force than the second return spring.

7. The electromechanical brake booster as recited in claim 6, wherein the electromechanical actuator has an electric motor and a rotation/translation converting transmission.

8. The electromechanical brake booster as recited in claim 7, wherein the rotation/translation converting transmission is embodied in the form of a rack-and-pinion transmission.

9. The electromechanical brake booster as recited in claim 1, wherein the electromechanical actuator has an electric motor and a rotation/translation converting transmission.

10. The electromechanical brake booster as recited in claim 9, wherein the rotation/translation converting transmission is embodied in the form of a rack-and-pinion transmission.

11. The electromechanical brake booster as recited in claim 1, wherein the second return spring has a greater spring force than the first return spring.

12. The electromechanical brake booster as recited in claim 11, wherein in the event of a failure of the electromechanical actuator, the brake master cylinder is actuated exclusively by muscular force and in order to actuate the master cylinder by muscular force, only the first return spring is stressed.

13. The electromechanical brake booster as recited in claim 1, wherein in the event of a failure of the electromechanical actuator, the brake master cylinder is actuated exclusively by muscular force and in order to actuate the master cylinder by muscular force, only the first return spring is stressed.

14. An electromechanical brake booster, comprising:
a muscular force transmitting element by means of which it is possible to use muscular force to actuate a brake master cylinder;
an electromechanical actuator by means of which it is also possible to actuate the brake master cylinder;
at least two return springs that move the brake booster back to a starting position after an actuation, including a first return spring configured to independently return the muscular force transmitting element and a second return spring configured to return the actuator without acting on the muscle force transmitting element; and
a telescoping booster element for transmitting an actuator force of the electromechanical actuator to a piston of the brake master cylinder.

15. The electromechanical brake booster as recited in claim 14, wherein the telescoping booster element is composed of an inner tube and an outer tube.

* * * * *